Figure 1:
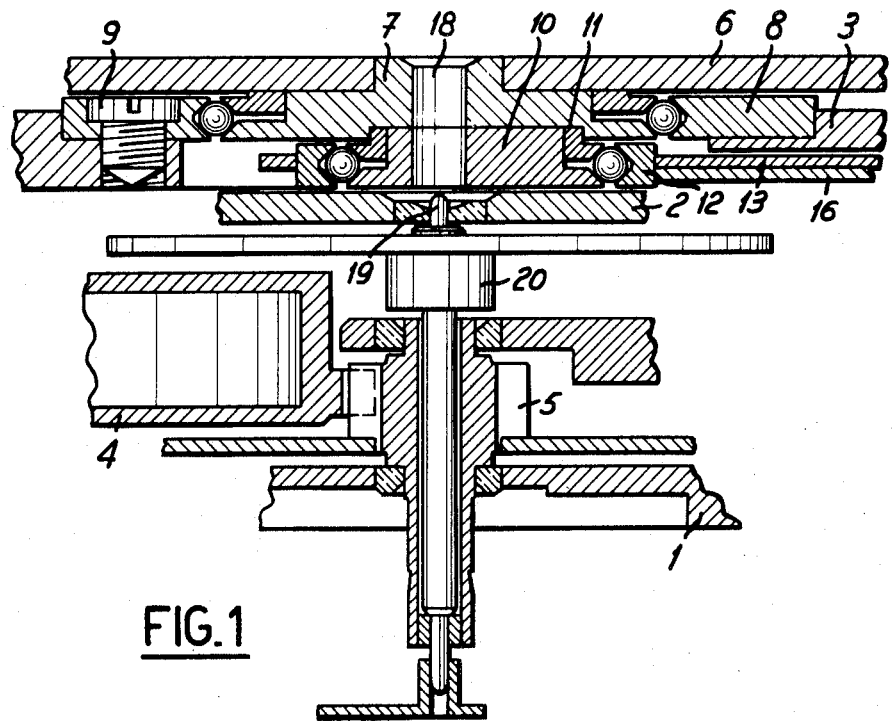

United States Patent

[11] 3,628,326

| [72] | Inventor | Raymond Polo |
| | | La Chaux-de-Fonds, Switzerland |
| [21] | Appl. No. | 878,842 |
| [22] | Filed | Nov. 21, 1969 |
| [45] | Patented | Dec. 21, 1971 |
| [73] | Assignees | Fabriques Movado |
| | | La Chaux-de-Fonds, ; |
| | | Fabriques des montres Zenith S.A. |
| | | Le Locle, Switzerland |
| [32] | Priority | Dec. 23, 1968 |
| [33] | | Switzerland |
| [31] | | 19137/68 |

[54] AUTOMATICALLY WINDING WATCH
2 Claims, 2 Drawing Figs.

[52] U.S. Cl............................................................. 58/82 A, 58/139
[51] Int. Cl. ........................................................... G04b 5/02
[50] Field of Search ................................................ 58/82, 139, 140, 116

[56] References Cited
FOREIGN PATENTS

| 460,639 | 9/1968 | Switzerland .................. | 58/82 |
| 1,211,556 | 1/1964 | Germany ....................... | 58/82 A |
| 274,296 | 3/1951 | Switzerland .................. | 58/82 A |
| 288,975 | 6/1953 | Switzerland .................. | 58/82 A |
| 288,976 | 2/1953 | Switzerland .................. | 58/82 A |

*Primary Examiner*—Richard B. Wilkinson
*Assistant Examiner*—George H. Miller, Jr.
*Attorneys*—Robert E. Burns and Emmanuel J. Lobato

ABSTRACT: An automatically winding watch comprises superimposed first and second ball bearings. The first ball bearing is fixed by its outer race and the inner race is rotatably oscillated by an oscillating mass. The inner race of the second ball bearing is eccentrically mounted in a recess in the inner race of the first ball bearing and the outer race thereof drives a pawl-bearing yoke with an oscillating movement. The two inner races can have a common bore allowing access to a sweep second pivot.

Inventor:
RAYMOND POLO

By Robert E. Burns
Attorney

AUTOMATICALLY WINDING WATCH

Automatically winding watches using an oscillating mass are well known. In such movements the winding is accomplished by an eccentric comprising two ball bearings, one between a fixed pivoting part and the eccentric, and the other between the eccentric and its crown, the pivoting part being made up of a wide fixed plate fastened to the frame. The eccentric, its crown, and the second ball bearing are placed side by side and in the same plane as the plate when the winding mass is fixed above the eccentric. The whole unit is placed above the frame over which it extends horizontally. This device requires a groove to prevent the outer race from turning.

There are also well-known mechanisms with cams or with ball bearings which work with a to and from movement, on an organ carrying two clicks acting on a ratchet wheel.

It has also been proposed to mount two ball bearings making up an eccentric on a pivot carrying the oscillating mass but this method results in a considerable thickness.

It is an object of the invention to provide a mechanism comprising two ball bearings into a compact unit and which will facilitate assembly and dismantling.

According to the invention, there is provided an automatically winding watch, a winding device comprising superimposed first and second ball bearings each having an inner and an outer race, wherein the first ball bearing is supported by its outer race and the inner race of the second ball bearing is eccentrically fixed to the inner race of the first ball bearing, an oscillating mass is provided on the inner race of said first ball bearing and pivotally oscillates about the axis thereof, and the outer race of said second ball bearing drives a pawl-bearing yoke with an oscillating movement.

The accompanying drawing shows, by way of example, one embodiment of the invention.

Figure 2:
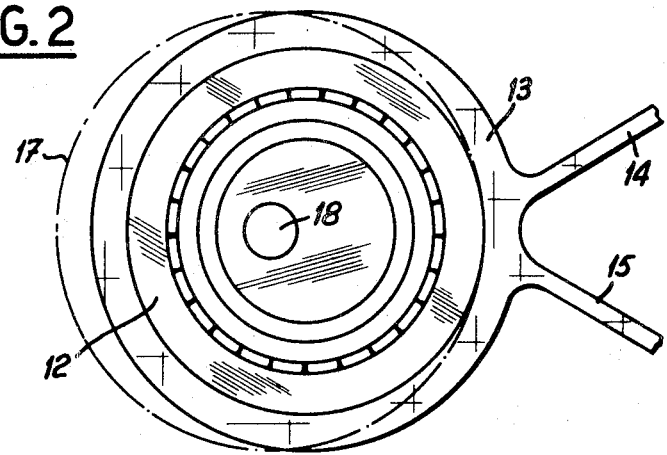

FIG. 1 is a partial cross-sectional view thereof.
FIG. 2 is a partial plan view thereof.

A plate 1, the train wheel bridge 2, and the frame for the automatic mechanism 3 are partially shown and barrel 4 meshes with the minute recording pinion 5, as shown.

The oscillating winding mass 6 is driven into a shoulder of the inner ring 7 of the upper ball bearing fixed by its outside race 8 by means of two screws 9, recessed into frame 3. The inner race 10 of the lower and eccentric ball bearing fits into a recess 11 in the race 7, while the outer race 12 is of one piece which includes the pawl-bearing yoke, and is provided with two flexible clicks 14 and 15 working on a ratchet wheel (not shown), supported by a plate 16 fastened to the frame 3.

In FIG. 2 the path of the eccentric ball bearing 12 is shown by the broken line 17.

The two ball bearings are not only inserted in an opening in the frame in such a way as to take up as little space as possible but their inner races are provided with a hole 18 which is so placed that it lies over the pivot 19 of the sweep second pinion 20 when the hands are put on, which in fact has the effect of taking the strain off the jewel for this pivot.

This winding mechanism utilizes a minimum number of parts, and can be easily assembled and dismantled.

What is claimed is:

1. In an automatically winding watch a winding device comprising, two ball bearings disposed for joint rotation coaxially and in a superposed relationship, each ball bearing having an inner race and an outer race, the inner race of one of said ball bearings having an eccentric recess, the inner race of the other ball bearing having an eccentric projection received in said recess joining the two ball bearings and for rotation eccentrically relative to the axis of said one ball bearing; an oscillating mass fixed to the inner race of said one ball bearing, a pawl-bearing yoke on the outer race of said other ball bearing, and said yoke having two angularly spaced flexible clicks for driving a ratchet element.

2. In an automatically winding watch a winding device according to claim 1, in which both inner bearings each opening superposed, and a sweep second pinion disposed aligned with said holes.

* * * * *